Figure 1:
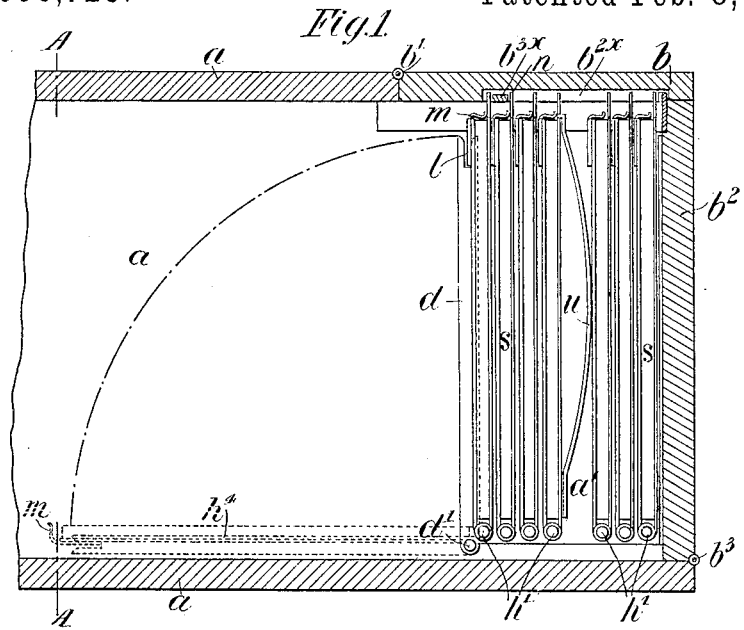

(No Model.) 2 Sheets—Sheet 1.

H. & C. GAMWELL.
PHOTOGRAPHIC CAMERA.

No. 598,728. Patented Feb. 8, 1898.

Witnesses.
J. D. Kingsbury.
G. C. Nimm

Inventors.
Harry Gamwell & Charles Gamwell
By Whitaker Prevost
Attys.

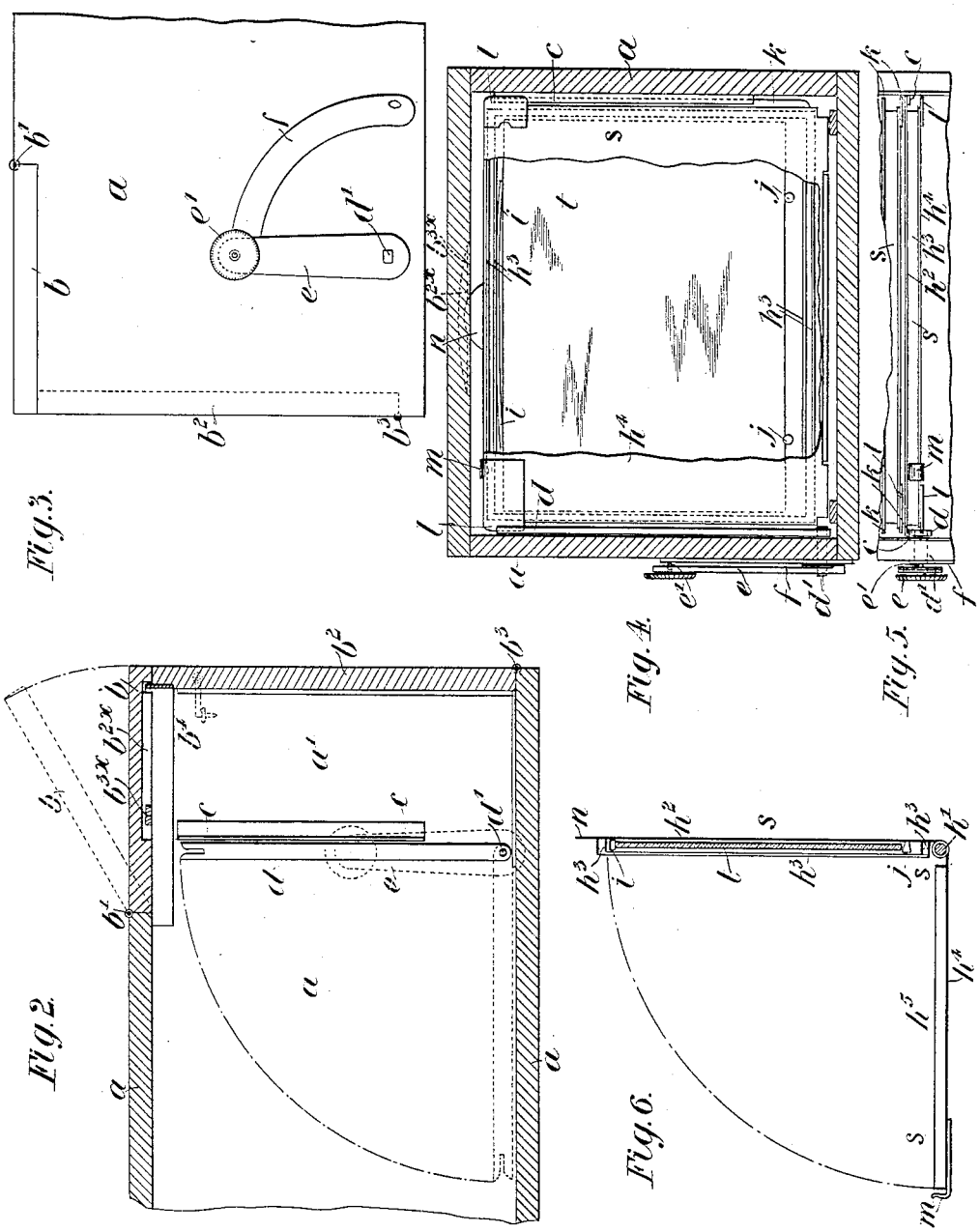

United States Patent Office.

HARRY GAMWELL AND CHARLES GAMWELL, OF LIVERPOOL, ENGLAND, ASSIGNORS, BY MESNE ASSIGNMENTS, TO THE ADAMS & WESTLAKE COMPANY, OF ILLINOIS.

PHOTOGRAPHIC CAMERA.

SPECIFICATION forming part of Letters Patent No. 598,728, dated February 8, 1898.

Application filed May 3, 1897. Serial No. 634,900. (No model.) Patented in England October 23, 1893, No. 19,914.

*To all whom it may concern:*

Be it known that we, HARRY GAMWELL and CHARLES GAMWELL, subjects of the Queen of Great Britain, residing at Liverpool, England, have invented new and useful Improvements in or Connected with Photographic Cameras or Apparatus, (for which we have obtained a patent in Great Britain, No. 19,914, dated October 23, 1893,) of which the following is a specification.

The present invention relates more particularly to hand-cameras, and has mainly for its object to provide and comprises a camera which shall possess qualities of an ordinary hand-camera—namely, that of carrying a battery or considerable number of sensitive plates, films, or the like—combined with that of being able to open it (without "bag" or other "dark" arrangements or the like, such as are now used) in the full light for manipulation or for other purposes without damaging or affecting said plates or other sensitive media used, and at the same time enabling the plates to be exposed from outside.

In a camera of the above improved character or construction there is employed a battery or series of closed and locked light-tight metallic plate-holders of narrow width—namely, preferably of just sufficient width to contain a sensitive plate, film-holder, or the like—each having a hinged door, the plate-holders being arranged one behind the other, and in a plane normally at right angles to the axis of the lens, within a chamber at the back of the camera and adapted to be moved up to the front of such chamber for the exposure of the sensitive surface by taking the foremost one out (say after an exposure) by the hand and placing it at the back or in an intermediate position, whereby the succeeding plate-holder is moved up to the front in the full daylight and with the camera open and without bag or other dark arrangements, while the door of the foremost plate-holder of the battery is adapted to be pressed open against the retentive action of the means or construction employed for locking or keeping closed the door thereof by a suitable device or part of a device within the camera, but operated from without when exposing the sensitive surface. Access to the plate-holders and plate-holder chamber for manipulating and changing them in the open light is had by a door above the same preferably, but at other parts, if desired, such as at the side, in addition to which a falling back to the plate-holder chamber may be provided in some cases.

Thus there is in a camera adapted to operate and fitted and constructed under this invention a chamber at the back of the camera, a battery or a number of closed and normally-locked metallic plate-holders—that is, plate-holders with a hinged door or part adapted to make it light-tight when closed and so constructed or provided with means that the said door remains locked, latched, or equivalently held when closed, so that the door will not fall open of itself, but be readily opened and closed from outside the camera by a suitable mechanism adapted to press it forward or backward against the retentive action of its construction for or means of locking or keeping it closed—which plate-holders are arranged one behind the other in vertical planes normally at right angles to the axis of the lens in the said chamber; a door or doors in the camera, preferably above or at one side of the camera, through which access is had to the plate-holders in the open daylight for manipulating them or placing them in position and without any dark hindrances, and a device by which the foremost plate-holder door of the battery can be pressed open from an actuating device from without the camera, the mode of operating the plate-holders being by opening the said plate-holder-chamber door and taking the foremost plate-holder after exposure from the front and placing it preferably at the rear of the battery, by which action the space within the chamber is kept filled and the feeding of the successive plate-holders up to the front for exposure of the sensitive plate or other media thereof is effected. By such a construction or combination of photographic apparatus and mode of operating same is provided a hand-camera containing a battery of sensitive plates, films, or the like capable of being manipulated with the camera open and in full daylight and without bags or other dark arrangements.

A photographic apparatus constructed and adapted to operate in the manner above described is illustrated in the accompanying drawings, which constitutes an example typical of the invention.

Figure 7:
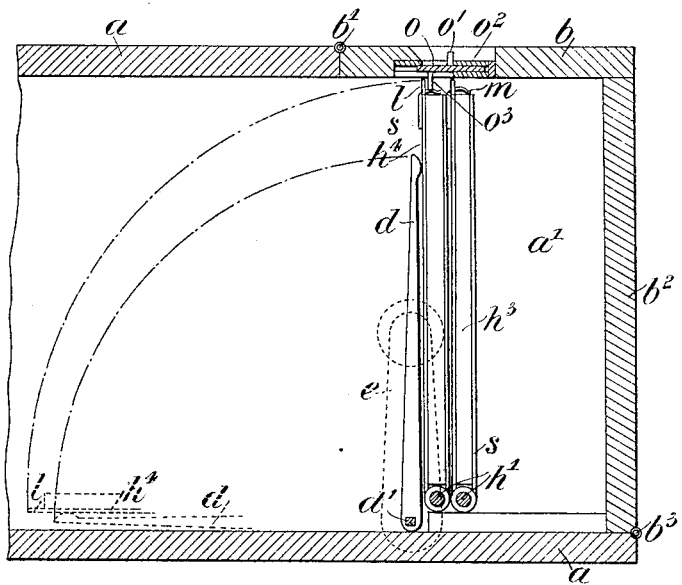

In the drawings, Figure 1 is a longitudinal sectional elevation illustrating the interior of the back part of a camera with the plate-holders therein. Fig. 2 is the same view without the plate-holders. Fig. 3 illustrates the camera viewed from outside, showing an external operating device. Fig. 4 is an end view or transverse section taken at the line A A, Fig. 1, looking toward the plate-holder chamber and showing the foremost plate-holder in a closed condition and partly showing the interior thereof. Fig. 5 is a plan showing the battery of plate-holders in position. Fig. 6 is a cross-section of a plate-holder with its door open and the plate or the like in position, and Fig. 7 is a sectional elevation of a modified arrangement of apparatus according to our invention.

Referring to the drawings, the general body of the camera is designated $a$, that portion of it constituting the chamber in which the battery of closed plate-holders is disposed being designated $a'$.

$b$ is a door at the top of the camera, hinged at $b'$ thereto, by which when it is open access is afforded to the plate-holders for manipulation, insertion, or other object or purpose. The back end $b^2$ when desired may also be adapted to open or fall, for which purpose it would be hinged, say at $b^3$, and fastened to the sides of the camera by hooks $b^4$, as shown in dottted lines.

$s$ denotes generally the plate-holders.

$c$ are inwardly-projecting ledges constituting front registers, against which the foremost plate-holder comes when in position.

$d$ is an arm having an upper bifurcated end, as shown, and mounted on a horizontal axis $d'$ at the bottom of the camera, and $e$ is an external actuating-arm connected with the arm $d$ by the spindle $d'$, which projects through the camera side. This arm $d$ and the arm $e$ constitute one species of mechanism by which the door of the foremost plate-holder $s$ can be operated—that is, opened and closed.

$f$ is a plate mounted on the side of the camera-body and against which a projecting part $e'$ on the inside of the arm $e$ bears and works, constituting a frictional retaining device by which the position of the arm or arms $d$ can be retained in any desired position.

The plate-holders $s$ are made of thin sheet metal—say, for instance, about 24 Birmingham metal-gage—as shown in the drawings, and constructed mainly of two parts hinged together at the bottom by a hinge or joint pin $h'$, one part constituting the back $h^2$ and inclosing sides $h^3$ and the other, $h^4$, the door by which the plate-holder is opened and closed. The sides $h^3$ are double and create a space between them all around the plate-holder, while the door $h^4$ is provided with a ledge $h^5$ all around on the inner side of the same, which when the door $h^4$ is closed fits in the space between the double sides $h^3$, so rendering the plate-holder light-tight when closed. Also, under this invention the plate-holders for use in photographic cameras are so made that the whole area of the sensitive plate contained by a plate-holder is exposed to the action of the light when exposed without any projections or the like over the sensitive surface, so showing a larger proportion of view than that shown when using ordinary plate-holders. Also, under this invention we provide a special mode or means of holding the plate or the like in the plate-holders. The space within the plate-holder sides $h^3$ is entirely open, and there is provided at the top a spring $i$ and at the lower part projecting supports $j$, preferably inclined on the upper surface, as shown, to afford a sure retention of the plate or other sensitive carrier in position and on which the lower edge of such plate or film (marked $t$ in the drawings) will rest when in position, the spring at the top being adapted to press the plate or the like downward onto the supports $j$ and so keep it steady and in the correct position within the plate-holder. The supports $j$, as shown in the drawings, are so disposed—that is, some distance above the inner of the lower sides $h^3$—as to leave a space below the plate or the like when in position, by which the finger or thumb can be placed against and under it for withdrawing the same or when placing it in the plate-holder, so rendering these operations readily performed.

The back $h^2$ of the plate-holders is provided with projecting ledges or flanges $k$, which come against the front registers $c$ when the plate-holders come to the front. The showing or indication as to which plate-holders have had their plates or the like exposed and which not is afforded, and the retention of these flanges against such registers and the filling of the chamber $a'$, so as to avoid looseness or rattle of the plate-holders, are effected by a spring. The spring in the arrangement shown in the drawings is a loose one, such as $u$, which travels or is moved with the plate-holders as they are moved in succession up to the registers.

The door $h^4$ of the plate-holders is provided with a projecting lug $l$ at each side. One of these lugs is adapted to fit into the end of the arm $d$, which is bifurcated or slotted, as shown, to receive it, and this is done as the plate-holders are moved up to the front of the chamber $a'$ by the lug $n$. By this engagement of the lug $l$ by the arm $d$ the door $h^4$ is caused to be opened—i. e., moved down and lifted up and shut—by the actuation down and up of the arm $e$. The plate-holders are so constructed or provided with such a device that the door when closed causes an automatic engagement or locking with the fixed part and such that it will not of itself open at any time, but will permit of its being easily opened and closed by a small pressure, thus rendering it easy of operation through an externally-actuated device, as herein referred to. For instance, the means of keeping the door of the plate-holder shut and the plate-holder light-tight shown in the drawings consists of an automatic frictional catch, being a metallic bar or projection $m$, secured or formed on the upper part of the door $h^4$ and adapted when closed to press with a slight but sufficient pressure upon the upper part or surface of the upper side $h^3$, it being of such thickness of metal as will give the amount of spring and friction desired and having its tip tapered or rounded, as shown, to enable it when the door is being closed to ride onto the upper side of $h^3$. This is one form of locking or retaining device; but other equivalent means may be used in lieu thereof, such as by adapting the ledge $h^5$ of the door $h^4$ to press onto one of the surfaces of the sides $h^3$ when closed, so creating a frictional locking or gripping construction or means.

The plate-holders are previous to being placed in the camera filled with a sensitive plate or the like in a dark room or chamber. When being placed in the chamber $a'$, the door $b$ is open. Each plate-holder is provided with a tab $n$ at the top, by which it can be held, and when placed in the camera the lug $l$ of the foremost plate-holder is dropped or placed in the slot in the arm $d$ or withdrawn therefrom with facility. Thus the chamber $a'$ can be charged with sensitive plates or other media in full daylight and without any dark arrangement whatever. When the camera is so charged, the door $b$ is closed and the camera shut up and ready for use.

In operation the front plate-holder, with its door closed, is placed in the camera with its door-lug $l$ in the bifurcated end of the arm $d$, as described, and the ledges $k$ bearing against the front registers $c$. To expose the plate or film of this plate-holder, its door $h^4$ is opened—that is, moved down—by pressing the actuating-lever $e$ forward and down until it takes or approaches the horizontal position, or sufficiently removed as not to interfere with the rays of light getting to the sensitive surface from the lens. When this is done, the exposure may be made in any of the ordinary ways. After the exposure is made the door $h^4$ is moved up by bringing back the lever $e$ to the vertical position, and the plate-holder is closed and locked. Then to expose another plate or the like the plate-holder last operated is removed, this being done by opening the door $b$ and lifting the plate-holder out of the arm $d$ and from the camera through the aperture covered by the door $b$. It is then placed behind the spring or follower $u$, so causing the then foremost plate-holder to be moved forward. This plate-holder is then raised slightly, so that one of the lugs $l$ will come above the lever $d$ when it is dropped into the bifurcated end thereof, the ledges $k$ of the plate-holder being brought up to the front registers $c$. When this is done, the door $b$ is again shut and the plate or film of the foremost plate-holder is ready to be exposed. All these actions are performed in the full light, so rendering the operations connected with the moving or manipulation of the sensitive plates or the like easy of accomplishment and effected with certainty—that is, without liability of mistake—which is often caused when using bags and other dark arrangements, or when the operations are not directly under view, and it also enables the plate-holders to be taken out and put in singly or in batches or otherwise manipulated.

It is to be stated that the invention is not restricted as regards the means of actuating the door of the plate-holders, as this may be effected in various ways and by different equivalents without departing from the scope of the invention; also, as regards that shown in the drawings, Figs. 1 to 6, in lieu of using one arm $d$ on one side an arm at each side may be used, in which case the lug $l$ at each side of the door would fit into the end of the arms and be actuated thereby.

As an instance or example of a modified means of actuating the plate-holder door one is shown in Fig. 7, wherein the door is opened by a slide at the top and closed by an arm actuated from the side. Referring to this modification shown in Fig. 7, the slide consists of a sliding piece $o$, having an upper projecting "thumb-catch" $o'$ thereon, its edges at the sides and ends working in and under a suitable guide-frame $o^2$, whereby light is prevented from entering the camera. On the under side of the slide $o$ a projecting part $o^3$ is provided, it being so arranged that when in operation the slide is being pressed forward it comes in contact with a projection $l$ on the upper edge of the front plate-holder door $h^4$ and moves it so far forward as to release the friction or catch $m$ from off the upper side $h^3$ of the plate-holder case. The door $h^4$ is thereby freed and will fall open of itself, or its falling may be assisted by the tilting downward of the front of the camera. To close the door, the actuating-arm $e$, which will be lying in the horizontal position or thereabout, is raised to the vertical position or thereabout, and so, through the arm $d$ within the camera, upon which the door $h^4$ will be resting, is raised and the door closed.

We show the doors of the plate-holder and camera as being hinged at the lower horizontal plane of the latter, but do not desire to be limited to this construction, as any form in which a normally-closed plate-holder having a hinged door may be inserted and firmly held within a camera, in conjunction with which mechanism is employed by which the plate-holder may while so held be opened and closed from without the camera, comes within the scope of our invention. It will be understood, of course, that if the plate-holder is so inserted within the camera that its cover or door swings otherwise than downwardly the controlling mechanism must be correspondingly disposed.

When a plate-holder is moved up to the front registers for being operated—that is, with its ledges $k$ bearing against the registers $c$—the lugs $l$ of the plate next behind will bear upon the back of the foremost plate-holder, and when this plate-holder is removed these lugs will then be brought up to the front register by the action of the spring-follower, and it will next be fed up or moved into the position for operating it, as above described.

To hold the plate-holder $h^2$ back firmly when the door $h^4$ is being closed, there is provided in the door $b$ a groove $b^{2\times}$ and a bar $b^{3\times}$ across it, which when the door is closed comes just behind the tab $n$, so forming a rigid stop or backing thereto.

In some cases, if desired, the plate-holders $s$ may be made of double construction—i. e., with two sensitive plates or the like therein back to back with a partition—namely, the part $h^2$ between them.

Having now particularly described and ascertained the nature of this invention and in what manner the same is to be performed, we desire to state that we make no claim to the features of construction of the plate-holder claimed in our application left contemporaneously with this application, nor to anything therein claimed, nor, broadly, to a camera adapted to contain one or more closed plate-holders; but

What we claim in respect of the herein-described invention is—

1. The combination with a light-proof camera-case having a lateral opening, and stops at its focal plane to limit the forward movement of a plate-holder, and with a light-proof plate-holder having flanges for engaging such stops and a hinged side having lateral wings or flanges; of a rigid shaft journaled across and controllable from without the case, an arm projecting laterally from the shaft within the case and having a longitudinal channel open at its end to receive the lugs or flanges of the plate-holder cover as such holder is adjusted through the lateral opening of the case.

2. The improvement in photographic cameras consisting in the combination with a case having a magazine-chamber at its rearward end, of a plurality of light-proof plate-holders each having a hinged door, such plate-holders being adapted for storage in the magazine parallel with the focal plane of the camera, and to be successively brought to such plane, a spring adapted to be inserted between adjacent plate-holders and to force the forward one to the focal plane, and means controllable from without the case for opening and closing the door of the plate-holders while at such plane, whereby the plate-holder at the focal plane may be opened and closed while the case is closed.

3. The combination with a magazine camera-case having a lateral door-closed opening, a storage-chamber at its rearward end and adapted to contain a plurality of plate-holders and to admit of their being brought successively to the focal plane; registers at its focal plane for limiting the forward movement of a plate-holder and for holding the body of the plate-holder against strain applied to swing its cover forwardly, and a stop for preventing backward movement of the plate-holder when at the focal plane, of a rock-shaft journaled across the case forward of the focal plane, a crank-arm fixed upon the shaft within the case and adapted to positively engage the cover of a plate-holder located at the focal plane to open and close it, means without the case for rocking the shaft, and a plurality of light-proof plate-holders having hinged covers adapted to interlock with the crank-arm when brought to the focal plane.

4. In a plate-holder the combination with a body portion adapted to contain a plate, and a hinged cover whereby the plate may be exposed while within the plate-holder, of supports for engaging one edge of a plate while within the plate-holder, and a spring for bearing against the opposite edge of such plate-holder to force it against the supports.

5. The combination with a plate-holder having an openable door and lateral flanges or wings extending from three of its sides, of a case having internal registers on two of its opposite sides for engaging two of such lateral flanges or wings, and an openable door having its inner surface adapted to engage the third of such wings or flanges, substantially as and for the purpose specified.

6. The combination with plate-holders each having a body portion adapted to receive a plate or the like and having lateral flanges or wings and double side walls spaced apart to form a continuous channel, and a cover hinged to the body portion and having a continuous flange for entering such channel and a laterally-projecting lug, of a casing having internal register-plates across two of its sides for engaging the lateral flanges of the body portion of one of the plate-holders, and an openable door having its inner face adapted to engage one of such lateral wings or flanges of the plate-holder, such case having a storage-compartment back of such register-plates for receiving a plurality of such plate-holders, a rock-shaft journaled within the case, a slotted arm fixed to such shaft and adapted to engage the lug of the plate-holder cover, and an actuating-arm fixed to such shaft without the case, substantially as described and for the purpose specified.

7. The combination with a light-proof camera-case having a laterally-opening door, stops at its focal plane for limiting the forward movement of a plate-holder, a chamber back of such stops to contain a plurality of plate-holders and admit of their advance in succession to the focal plane, a rock-shaft pivoted within the case parallel with the focal plane and controllable from without the case, and an arm projecting laterally from the shaft and having a channel extending inwardly from its end; of a plurality of light-proof plate-holders adapted to enter the chamber of the case and each having a hinged cover and wings on its body portion for engaging the stops at the focal plane and lugs or flanges on its cover for entering the channel of the arm, whereby a plate-holder cover may be brought into engagement with the arm by manipulation through the lateral opening of the case substantially as described.

8. The combination with a light-proof camera-case, having a lateral opening and a door for such opening, stops at the focal plane for limiting the advance of a plate-holder, a chamber back of such stops for containing a plurality of plate-holders so that they may be brought successively to the focal plane, a rock-shaft journaled within the case parallel with its focal plane and controllable without the case, and an arm projecting from such shaft and adapted for positive engagement with a plate-holder cover; of a plurality of light-proof plate-holders adapted to enter the chamber of the case and to engage its stops at the focal plane, such plate-holders having hinged sides adapted to be brought into engagement with the arm as the plate-holder is brought to its seat at the focal plane.

HARRY GAMWELL.
CHARLES GAMWELL.

Witnesses:
F. W. PRICE,
T. W. STONIDEN.